United States Patent
Farley et al.

(10) Patent No.: US 6,640,527 B2
(45) Date of Patent: Nov. 4, 2003

(54) CENTER FEED FINGER ADJUSTMENT MECHANISM FOR HEADER

(75) Inventors: Herbert M. Farley, Elizabethtown, PA (US); James F. Rayfield, New Holland, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/017,603

(22) Filed: Dec. 18, 2001

(65) Prior Publication Data

US 2003/0110750 A1 Jun. 19, 2003

(51) Int. Cl.⁷ ............................................. A01D 46/08
(52) U.S. Cl. ......................................... 56/12.4; 56/364
(58) Field of Search ....................... 56/364, 12.4, 12.5, 56/14.5, 14.6; 198/494, 613, 692, 693, 722, 723

(56) References Cited

U.S. PATENT DOCUMENTS

| | | | |
|---|---|---|---|
| 2,701,634 A | * 2/1955 | Carroll | 198/518 |
| 2,748,921 A | * 6/1956 | White | 198/518 |
| 3,060,665 A | * 10/1962 | Escher | 56/16.4 R |
| 3,142,375 A | * 7/1964 | Luke | 198/693 |
| 3,926,108 A | * 12/1975 | Doering | 100/177 |
| 4,271,956 A | * 6/1981 | Hutchinson et al. | 198/613 |
| 4,539,801 A | 9/1985 | Field | |
| 5,090,187 A | * 2/1992 | Mews | 56/364 |
| 5,620,083 A | * 4/1997 | Vogelgesang | 198/722 |
| 5,768,868 A | 6/1998 | Stein | |
| 5,813,205 A | 9/1998 | Gosa | |

FOREIGN PATENT DOCUMENTS

| | | | | |
|---|---|---|---|---|
| BE | 511048 | * | 5/1952 | 56/364 |
| CA | 483934 | * | 6/1952 | 56/364 |
| SE | 176161 | * | 8/1961 | 56/364 |

* cited by examiner

*Primary Examiner*—Árpád Fábián Kovács
(74) *Attorney, Agent, or Firm*—John William Stader; A. Nicholas Trausch; Rebecca L. Henkel

(57) ABSTRACT

The mechanism alters the position of a set of auger fingers positioned in front of a feederhouse opening relative to auger fingers on the outer ends of a transverse auger of a header of a combine harvester. A center finger auger shaft is positioned between two outer finger auger shafts. An outer shaft plate having a series of radially placed holes may be adjusted to change the position of a center shaft plate. This changes the position of the center auger finger shaft affixed to the center shaft plate. This permits the auger fingers to be moved either towards or away from the header floor.

14 Claims, 3 Drawing Sheets

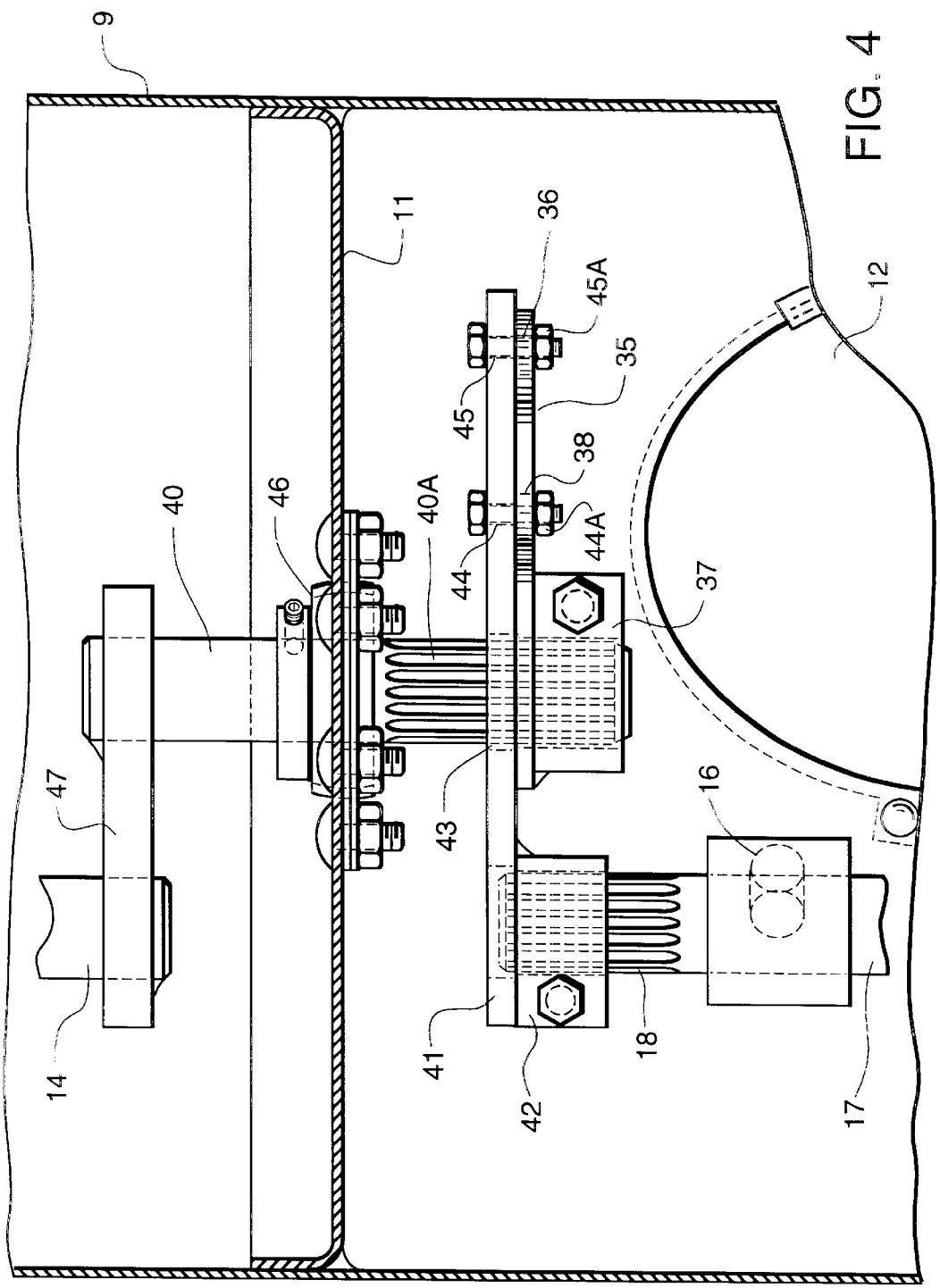

CENTER FEED FINGER ADJUSTMENT MECHANISM FOR HEADER

BACKGROUND OF INVENTION

1. Field of Art

This invention relates to the improvement of the header on an agricultural combine. More specifically, the invention is an adjustment mechanism for the center feed fingers on an auger for an agricultural combine.

2. Description of Prior Art

Mechanical harvesting of grain has taken place for decades. However, efforts continue in the attempt to make harvesting operations more efficient and effective. A combine harvester generally includes a header, which cuts the crop. The header then moves the cut crop into a feeder house. The feeder house lifts the cut crop into the threshing, separation and cleaning areas of the combine. The grain is separated from the stalk by a rotor or cylinder threshing system. The grain is then separated and moved and stored in a grain tank. The chaff and trash are deposited from the rear of the combine. The grain stored in the grain tank is eventually discharged through a grain tank unload tube. An operator usually runs these various operations from a glass-enclosed cab. Typically, the cab is located above and behind the header and feederhouse. There are a variety of agricultural combines harvesters and their operations are well known in the art. For examples of such harvesters reference U.S. Pat. No. 4,846,198 which illustrates the conventional and twin rotor threshing and separating systems of a harvester as well as other major systems of the harvester. See also the New Holland Super Conventional Combines TX™ 66, TX™ 68, the New Holland TWIN ROTOR® combines TR® 89 and TR®99 for examples of existing conventional and twin rotor harvesters. U.S. Pat. No. 4,332,262 also illustrates the primary systems of a conventional harvester. For further details regarding various agricultural harvester systems review U.S. Pat. Nos. 4,522,553, 4,800,711, 4,866,920, 4,907,402, 4,967,544 and 5,155,984. See also the New Holland corn head model 996 and the New Holland grain belt header model 994 for details regarding headers.

Focusing on the header 5 of the combine there is a transverse auger surrounded by auger flighting. Beneath the auger is the header floor and auger trough. Behind the auger is a stripper bar. After the sicklebar cuts the crop, the crop is moved from the outer ends of the header to the center by the auger flighting—preferably though the auger trough. From the center of the header, the crop is fed into the feederhouse. An elevator consisting of a series of chains and slats raises the cut grain from the header into the threshing and separating systems of the combine. To assist the orderly and efficient movement of the cut crop towards the center of the header, a series of auger fingers are used. It should be noted that it is desirable for the crop to be cut and pushed by the auger flighting through the auger trough to the center of the header. It is damaging for the same crop material to pass repeatedly over the top of the auger and be pushed again by the auger flighting. Furthermore, the smooth flow of crop through the header allows the combine to travel at greater speeds and process more crop in less time. To help limit damage and control the movement of the crop material, auger fingers are attached to an offset shaft positioned within the auger. The fingers periodically extend through the auger and pull the crop at a proper rate away from the sicklebar and beneath the auger into the trough. The fingers are offset so that when the crop is cut by the sicklebar it is pulled beneath the auger onto the floor of the header. A stripper bar behind the auger also attempts to prevent the crop from repeatedly going over the top of the auger. The angle of the auger fingers is adjustable relative to the bottom floor of the header depending the amount of crop the header is experiencing. For instance, in heavy crop conditions, the tips of the auger fingers are angled towards the floor. In this manner, the auger fingers more 'aggressively' pull the crop beneath the auger. In light crop conditions, the tips of the auger fingers are adjusted to point more upwardly from the floor. This prevents the crop from being too aggressively pulled beneath the auger and possibly over the top of the auger. Adjusting the tips of the auger fingers to assist in the proper flow of crop is well known by those skilled in the art. However, presently the auger fingers are mounted on a single offset shaft. Because of the different amounts of crop present at different points in the header it is difficult to effectively adjust the auger fingers. For example, as more crop enters the header and is pushed towards the center. This results in the area in front of the feederhouse becoming saturated with crop. If the auger fingers are adjusted to the aggressive position so as to avoid this problem at the center of the header, then crop at the outsides of the header is pulled too quickly beneath the auger resulting in the crop material passing over the top of the header. Again, this is disruptive to the smooth flow of the crop through the header to the feederhouse.

The prior art illustrates these drawbacks. U.S. Pat. No. 5,768,868 illustrates an attachment for a grain harvester. Specifically, it illustrates an adjustment mechanism for a single offset auger shaft for the purpose of adjusting the position of the auger fingertips. However, there is no mechanism disclosed for adjusting the fingers independently of other fingers within the auger. U.S. Pat. No. 5,813,205 illustrates a guide assembly for disappearing fingers. This patent focuses on preventing auger fingers from detaching, entering and damaging the threshing system of a combine. It does not discuss the adjustment of the fingers to improve the crop flow. U.S. Pat. No. 4,539,801 illustrates a resilient feed auger attachment. This invention prevents crop material from entering and entangling the single offset auger shaft A mechanism that would permit the independent adjustment of the auger fingers at the center of the header would represent an important improvement to a header of an agricultural combine.

OBJECTS OF THE INVENTION

It is an object of the present invention to provide a mechanism for adjusting the center auger fingers relative to the outer auger fingers on a header of an agricultural combine harvester.

It is an object of the present invention to provide a mechanism that improves the entry of crop into the feederhouse of an agricultural combine harvester.

It is an object of the present invention to provide a mechanism that improves the flow of crop through the header of an agricultural combine harvester.

SUMMARY OF THE INVENTION

The invention is an improvement to adjusting the auger fingers of a header on an agricultural combine. The invention allows the center auger fingers to be adjusted relative to the outer auger fingers. The mechanism is positioned between the outer finger shaft and center finger shaft within the transverse auger of a combine header. The mechanism has a center crank shaft attached to outer finger shaft. Affixed to the center crank is an outer shaft plate. The outer shaft plate has a series of radially placed adjustment holes. A center shaft plate is affixed to the center shaft. By adjusting the position of the outer shaft plate and securing it to the center shaft plate by the adjustment holes, the position of the center auger shaft to be adjusted relative to the outer auger shaft. Since the auger fingers are affixed to the shafts, the tips of these auger fingers may be adjusted relative to their respective location on the header.

BRIEF DESCRIPTION OF DRAWINGS

The advantages of this invention will be apparent upon consideration of the following detailed disclosure of the invention, especially when taken in conjunction with the accompanying drawings wherein:

FIG. 4 is a fragmentary top plan view of the adjustment mechanism as seen from the line 4—4 of FIG. 2.

DETAILED DESCRIPTION OF THE INVENTION

Figure 1:
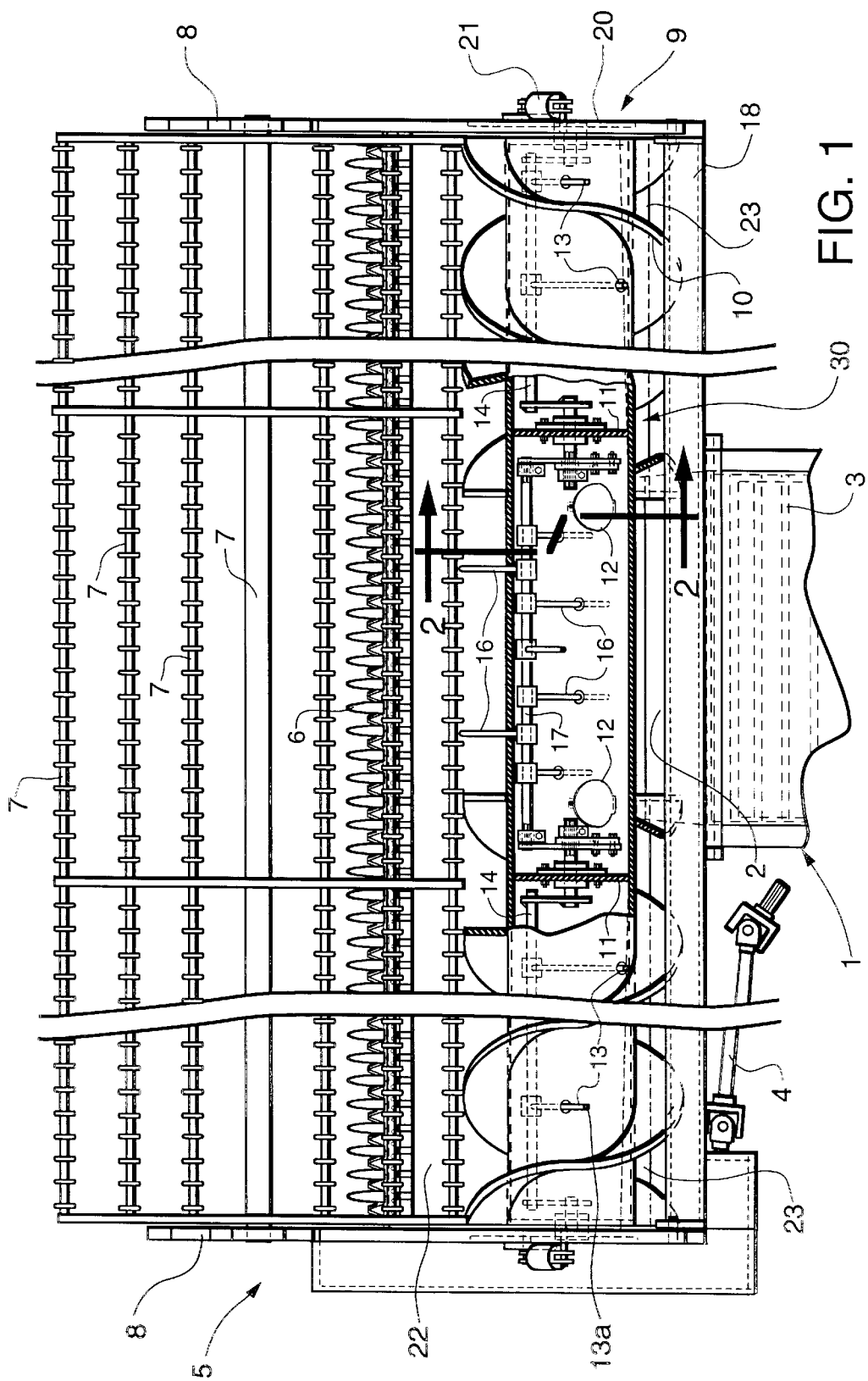
FIG. 1 is a fragmentary top plan view of the header and associated portion of a feederhouse with the center portion of the header auger broken away to reveal the center auger finger adjustment mechanism of the present invention.

Referring to the drawings, it is possible to observe the major elements and general operation of the present invention. Left and right references are used as a matter of convenience and are determined by standing at the rear of the header and facing the forward end in the normal direction of travel. Likewise, forward and rearward are determined by normal direction of travel of the header. Upward or downward orientations are relative to the ground or operating surface. Horizontal or vertical planes are also relative to ground.

The invention is located on a combine having a pair of front wheels and a pair of rear wheels for providing movement over the ground. As viewed in FIG. 1, at the front of the combine is a header 5 for cutting a crop. The header 3 has a frame 19 and a pair of opposing sidewalls 20. The header 5 receives rotational power from the driveline 4. As the combine and header 5 are moved forward, a reel 7 pushes the crop towards the header 5. A sicklebar 6 cuts the grain and stalk. The crop enters an auger trough (not visible) on the floor 23 of the header 5. A transverse auger 9 with flighting 10 pushes the grain and stalk in the auger trough to the center of the header 5. A series of outer auger fingers 13 assist in moving the crop to the center of the header. A series of center auger fingers 16 assist in moving the crop into the feederhouse 1 through the feederhouse opening 3. The feederhouse 1 has elevator 3 for moving the crop to the threshing and separating systems of the combine. Returning to the header, a stripper 23 prevents the crop from being pushed over the top of the auger. The present invention 30, as generally viewed in FIG. 1, is a center feed finger adjustment mechanism. The invention 30 will be discussed in greater detail later in this description. The header 5 may be positioned and re-positioned relative to the ground. The header 5 may also be tilted to the left or right or may be positioned relatively high or low to the ground. These features are constantly being adjusted depending on the terrain and crop conditions. Moveable headers are well known and established in the art. After processing, separation and cleaning the grain transported by a clean grain elevator upwards and dumped into the clean grain transition. The bubble-up auger lifts the clean grain from the clean grain transition and deposits the grain at the top of the grain tank located near the top of the combine. The grain is transferred from the grain tank to a transport vehicle by an unload auger tube. The trash or chaff is ejected from the rear of the combine by a chaff spreader. The operator controls the combine from the cab located behind the header and at the front of the combine. From the cab the operator can observe most of the various combine functions. The cab usually has a large glass window or several windows that afford the operator the maximum ability to monitor the header. An engine generally positioned at the rear of the combine powers the combine and various systems. Most of the major systems in a combine are discussed and well known in the prior art.

As previously indicated, the present invention is a center feed finger adjustment mechanism 30. Positioned inside the auger 9, is an outer auger finger shaft 14. The outer shaft 14 may be adjusted by a conventional adjustment mechanism 21. Two outer auger finger shafts 14 positioned at opposing ends of the header 5 and extend from the sidewalls 20 towards the center of the header 3. Affixed to the outer finger shafts 14 are a series of outer auger fingers 13. At the end of finger 13 is a outer finger tip 13a. Positioned inside the auger 9, between the outer auger finger shafts 14 and generally in front of the feederhouse opening 2, is the center finger shaft 17. The outer finger shaft 14 and center finger shaft 17 are connected near the auger baffle 11. There are two adjustment mechanisms 30 on each side of the header 5. Since the mechanisms are identical in most respects, only one will be described in detail.

Figure 2:
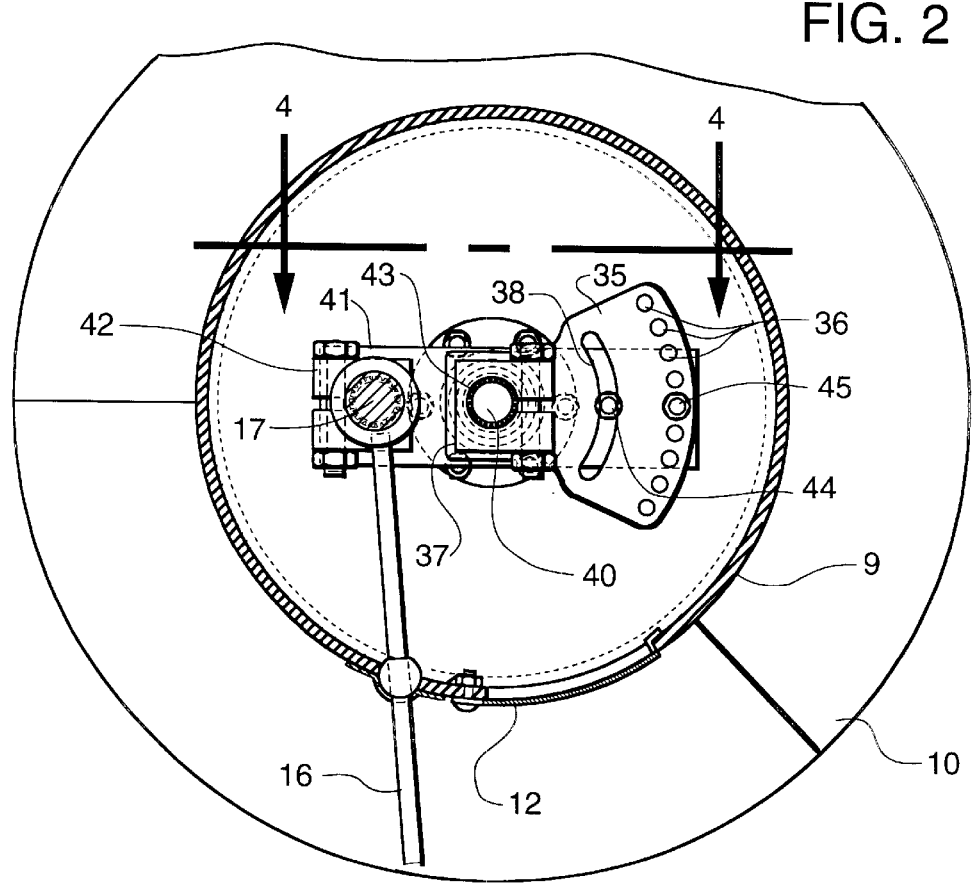
FIG. 2 is an enlarged sectional view of the auger taken on the line 2—2 of FIG. 1.
Figure 3:
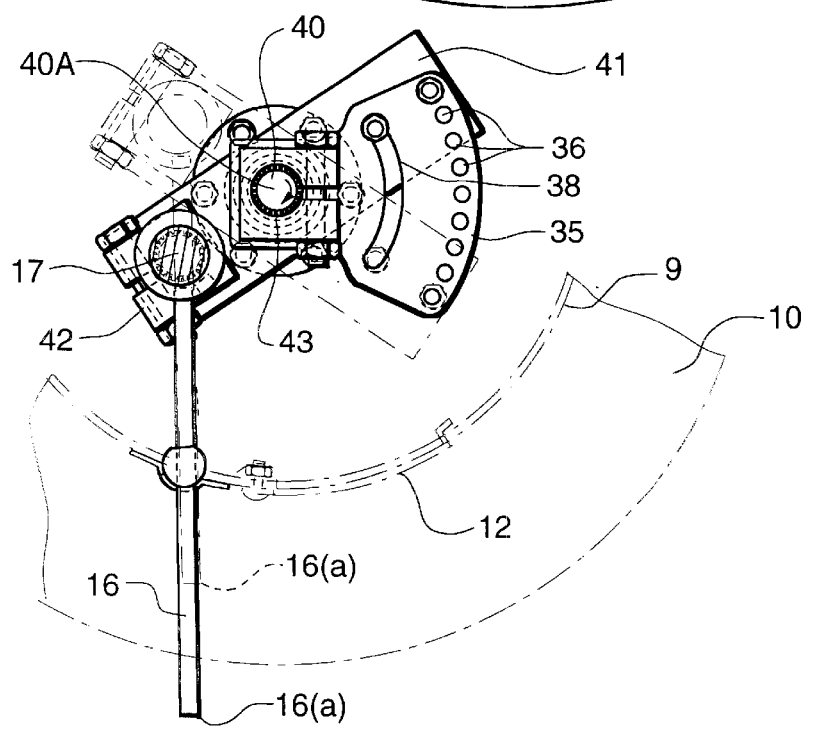
FIG. 3 is a view similar to FIG. 2 showing the parts of the adjustment mechanism adjusted to the limits of their range.

Referring to FIG. 4, it is possible to view most of the specific elements of the invention 30. The outer finger shaft 14 is connected to the center crank 40 by the outer crank arm 47. The auger baffle 11 and bearing 46 supports the center crank 40. At the end of the center crank 40 are a series of center crank splines 40a. Clamped to the center crank 40 and about the center crank splines 40a is the outer shaft plate 35. As seen in FIGS. 2 and 3, the outer shaft plate 35 is affixed to the center shaft plate 41. The splined center finger shaft 17 is clamped to the center shaft plate 41. Affixed to the center finger shaft 17 is the center auger fingers 16. At the end of each finger 16 is a tip 16a.

The outer shaft plate 35 has an outer shaft clamp 37 for clamping onto the center crank splines 40a. The outer shaft plate 35 also has a series of radially placed adjustment holes 36. There is also an arc 38. The arc 38 and radially placed adjustment holes 36 clamp the outer shaft plate 35 to the center shaft plate 41. The adjustment holes are equidistant from the axis 40a of the center crank 40. By loosening a bolt in the arc, it is possible to adjust the outer shaft plate 35 relative to the center shaft plate 41. By inserting another bolt into one of the adjustment holes 36, the center shaft plate, and consequently the center finger shaft 17, may be re-adjusted and fixed in a new position.

The center shaft plate 41 has a center shaft clamp 42 affixed to the center shaft splines 18. There is also a center shaft aperture 43 that allows the center crank 40 to pass unrestricted through the center shaft plate 41. There is a first bolt hole 44 for receiving a bolt that also passes through the arc 38 in the outer shaft plate 35. There is also a second bolt hole 45 for receiving a bolt that passes through one of the radially placed adjustment holes 36 in the outer shaft plate 35.

As seen in FIG. 3, it is possible to adjust the center finger auger tips 16a so as to move the center auger finger tip 16a either closer or further to the floor 23. When the finger tip 16a is moved closer to the floor, the crop is more aggressively pulled into the header 5. The phantom view of FIG. 3 shows the finger tip 16a in its least aggressive position. Typically the outer shaft plate 35 is positioned as shown in either FIG. 2 or FIG. 3. The phantom version shown in FIG. 3 shows the finger tip 16a in a less aggressive configuration than the alternative shown in FIG. 3. To adjust the position of the finger tip 16a, the operator accesses the adjustment mechanism 30 by opening the access cover 12 on the auger 12. The bolt in the arc 38 is loosened and the bolt in the adjustment hole 36 is removed. At this point the center finger shaft 17 is able to move relative to the outer finger shaft 14. When the finger tip 16a is correctly positioned, the bolt is re-inserted into the nearest adjustment hole 38. The same procedure must also be accomplished on the adjustment mechanism 30 positioned at the other end of the center finger shaft 17. The center shaft plate 41 and outer shaft plate 35 are indentical and may be used at either end of the center finger shaft 17. The identical nature of these plates helps reduce the cost of the design.

It will be obvious to those skilled in the art that various changes may be made without departing from the scope of the invention and the invention is not to be considered limited to what is illustrated in the drawings and described in the specification.

What is claimed is:

1. A header of a combine harvester comprising:
   a. an auger;
   b. a reciprocating outer auger finger shaft positioned within the auger, said outer finger shaft having a series of outer fingers affixed thereon;
   c. a reciprocating center finger shaft positioned within the auger and attached to the outer auger shaft, said center finger shaft having a series of center fingers affixed thereon; and
   d. a means for adjusting the center finger shaft relative to the outer finger shaft, wherein the means for adjusting the center finger shaft relative to the outer finger shaft further comprises:
      i. a center crank affixed to an outer shaft;
      ii. an outer shaft plate affixed to the center crank;
      iii. a center shaft plate affixed to the center finger shaft; and
      iv. a means for selectively affixing the outer shaft plate to the center shaft plate.

2. The header described in claim 1, wherein the means for selectively affixing the outer shaft plate to the center shaft plate further comprising:
   a. a series of radially placed adjustment holes within the outer shaft plate; and
   b. the outer shaft plate having an arc, therein,
   c. the center shaft plate having a first hole and second hole, therein, whereby a first bolt is inserted into the first hole and a second bolt is inserted into the second hole.

3. The header described in claim 2 wherein the series of radially placed adjustment holes are equally spaced from the rotational axis of the center crank.

4. The header described in claim 3 wherein the auger further comprises an access cover proximate to the center crank to allow access to the outer shaft plate and the center shaft plate.

5. The header described in claim 4 further comprising a center shaft clamp affixed to the center shaft plate for receiving and securing the center shaft and a outer shaft clamp affixed to the outer shaft plate for receiving and securing the center crank.

6. The header described in claim 5 further comprising a bearing affixed to an auger baffle, said baffle affixed to the auger, the bearing receiving and supporting the center crank.

7. The header described in claim 6 wherein said outer finger shaft further comprises a pair of outer finger shafts, said center finger shaft positioned between the pair of outer finger shafts, said center finger shaft having a rotational axis generally parallel to a rotational axis of the pair of outer finger shafts.

8. In a header for an agricultural harvester, said header attached to a feederhouse, said feederhouse positioned near a midpoint of the header, said header having a frame supporting a pair of opposing sidewalls, a floor positioned between the sidewalls, a stripper and a sickle bar attached to the floor, an auger rotaionally affixed between the side walls, an improvement comprising:
   a. a reciprocating outer finger shaft rotationally affixed to the side wall and co-axial to the auger;
   b. a reciprocating center finger shaft rotationally affixed to the outer finger shaft;
   c. a plurality of outer fingers affixed to the outer finger shaft, each outer finger having an outer finger tip;
   d. a plurality of center fingers affixed to the center finger shaft, each center finger having a center finger tip, wherein the center finger tips are positioned proximate to the feederhouse; and
   e. means for adjusting the plurality of the tips of the center fingers relative to the tips of the outer fingers and simultaneously relative to the floor, wherein said means for adjusting the plurality of center finger tips relative to the outer finger tips further comprises:
      i. a center crank affixed to the outer shaft;
      ii. an outer shaft plate affixed to the center crank;
      iii. a center shaft plate affixed to the center finger shaft; and
      iv. a means for selectively affixing the outer shaft plate to the center shaft plate.

9. The improvement in claim 8, wherein the means for selectively affixing the outer shaft plate to the center shaft plate further comprising:
   a. a series of radially placed adjustment holes within the outer shaft plate; and
   b. the outer shaft plate having an arc, therein,
   c. the center shaft plate having a first hole and second hole, therein, whereby a first bolt is inserted into the first hole and a second bolt is inserted into the second hole.

10. The improvement in claim 9, wherein the series of radially placed adjustment holes are equally spaced from the rotational axis of the center crank.

11. The improvement in claim 10, wherein the auger further comprises an access cover proximate to the center crank to allow access to the outer shaft plate and the center shaft plate.

12. The improvement in claim 11, further comprising a center shaft clamp affixed to the center shaft plate for receiving and securing the center shaft and a outer shaft clamp affixed to the outer shaft plate for receiving and securing the center crank.

13. The improvement in claim 12, further comprising a bearing affixed to an auger baffle, said baffle affixed to the auger, the bearing receiving and supporting the center crank.

14. The improvement in claim 13, wherein said outer finger shaft further comprises a pair of outer finger shafts, said center finger shaft positioned between the pair of outer finger shafts, said center finger shaft having a rotational axis generally parallel to a rotational axis of the pair of outer finger shafts.

* * * * *